United States Patent
Sena, Jr.

(10) Patent No.: US 10,244,107 B1
(45) Date of Patent: Mar. 26, 2019

(54) SYSTEMS AND METHODS FOR CAUSING DISPLAY OF A REPUTATION INDICATOR ASSOCIATED WITH A CALLED PARTY

(71) Applicant: Neustar, Inc., Sterling, VA (US)

(72) Inventor: Guido Jonjie S. Sena, Jr., Sterling, VA (US)

(73) Assignee: Neustar, Inc., Sterling, VA (US)

( * ) Notice: Subject to any disclaimer, the term of this patent is extended or adjusted under 35 U.S.C. 154(b) by 17 days.

(21) Appl. No.: 15/796,673

(22) Filed: Oct. 27, 2017

Related U.S. Application Data

(63) Continuation-in-part of application No. 15/791,169, filed on Oct. 23, 2017.

(51) Int. Cl.
*H04M 3/42* (2006.01)

(52) U.S. Cl.
CPC ..... *H04M 3/42093* (2013.01); *H04M 3/4211* (2013.01)

(58) Field of Classification Search
CPC .... H04M 3/42093; H04M 15/08; H04L 47/24
See application file for complete search history.

(56) References Cited

U.S. PATENT DOCUMENTS

| | | |
|---|---|---|
| 8,068,593 B2 | 11/2011 | Batni et al. |
| 2006/0147010 A1 | 7/2006 | Batni et al. |
| 2007/0127642 A1 | 6/2007 | Bae et al. |
| 2007/0211872 A1 | 9/2007 | Cai et al. |
| 2010/0318614 A1* | 12/2010 | Sager ............. G06Q 10/107 709/206 |
| 2014/0295802 A1* | 10/2014 | Rybak ............. H04L 47/24 455/412.1 |
| 2014/0335822 A1* | 11/2014 | Jain ............. H04M 15/08 455/407 |
| 2017/0339273 A1* | 11/2017 | White ............. H04M 3/42042 |

* cited by examiner

*Primary Examiner* — Myron Wyche
(74) *Attorney, Agent, or Firm* — Perkins Coie LLP

(57) ABSTRACT

In one implementation, a communications device operable by a calling party may include one or more processors configured to receive an identifier associated with a called device from the calling party, and receive an input command to establish a communications session with the called device from the calling party. After the receiving of the input command, the one or more processors may attempt to establish the communications session with the called device. Further, the one or more processors may transmit the identifier to a called-party analyzer. The called-party analyzer, in response to receiving the identifier, may generate a reputation value based on analysis of data originating from at least one of: (i) a communications service provider, (ii) a caller-name lookup service provider, and (iii) an identity information provider. The reputation value may be indicative of a likelihood that at least one of the called device and a called party associated with the called device is involved in attempting to establish unwanted communications sessions. Further, the called-party analyzer may transmit the reputation value destined for the communications device. The communications device may receive the reputation value originating from the called-party analyzer and cause an output generated based on the reputation value on an output the communications device.

21 Claims, 18 Drawing Sheets

120

120

120

SYSTEMS AND METHODS FOR CAUSING DISPLAY OF A REPUTATION INDICATOR ASSOCIATED WITH A CALLED PARTY

CROSS-REFERENCE TO RELATED APPLICATIONS

The application is a continuation-in-part of U.S. application Ser. No. 15/791,169 titled "COMMUNICATION SYSTEMS AND METHODS FOR CAUSING DISPLAY OF VISUAL CONTENT ON A SCREEN ASSOCIATED WITH A CALLING DEVICE," and filed on Oct. 23, 2017. The disclosure of the application is hereby incorporated by reference in its entirety for all purposes.

TECHNICAL FIELD

The present disclosure relates to systems and methods for causing output of a reputation indicator associated with a called party. In particular, the present disclosure relates to communications systems and methods for causing display a visual indicator on a communications device operable by a calling party. The visual indicator may be generated based on a reputation value that is indicative of a likelihood that the called party is involved in placing unwanted calls.

BACKGROUND

According to the Federal Communication Commission (FCC), making autodialed or prerecorded calls—better known as robocalls—to emergency telephone lines or to consumers' wireless phones and residential telephone lines without consent is illegal. For more than two decades, Congress and the FCC have worked to protect consumers from these illegal, unwanted, and disruptive calls. Many of these efforts focus on stopping such calls from reaching consumers. Despite these and other efforts, robocalls continue to be the number one consumer complaint to the FCC. As technology improved, these calls have become more prevalent, more threatening, and harder to stop. It is now easier than ever for nefarious robocallers to use spoofing technology to mask their true identities, tricking consumers into answering the call and trusting the caller, while evading detection.

SUMMARY

In one embodiment, a communications device operable by a calling party may include one or more processors configured to receive an identifier associated with a called device from the calling party, and receive an input command to establish a communications session with the called device from the calling party. After the receiving of the input command, the one or more processors may attempt to establish the communications session with the called device. Further, the one or more processors may transmit the identifier to a called-party analyzer. The called-party analyzer, in response to receiving the identifier, may generate a reputation value based on analysis of data originating from at least one of: (i) a communications service provider, (ii) a caller-name lookup service provider, and (iii) an identity information provider. The reputation value may be indicative of a likelihood that at least one of the called device and a called party associated with the called device is involved in attempting to establish unwanted communications sessions. Further, the called-party analyzer may transmit the reputation value destined for the communications device. The communications device may receive the reputation value originating from the called-party analyzer and cause an output generated based on the reputation value on an output the communications device.

In another embodiment, a method for a communications device operable by a calling party may include receiving an identifier associated with a called device from the calling party, and receiving an input command to establish a communications session with the called device from the calling party. The method may further include, after the receiving of the input command, attempting to establish the communications session with the called device, and transmitting the identifier to a called-party analyzer. The called-party analyzer, in response to receiving the identifier, may generate a reputation value based on analysis of data originating from at least one of: (i) a communications service provider, (ii) a caller-name lookup service provider, and (iii) an identity information provider. The reputation value may be indicative of a likelihood that at least one of the called device and a called party associated with the called device is involved in attempting to establish unwanted communications sessions, and the called-party analyzer may transmit the reputation value destined for the communications device. The method further includes receiving the reputation value originating from the called-party analyzer and causing an output generated based on the reputation value on an output the communications device.

In yet another embodiment, a non-transitory computer-readable storage medium storing instructions that when executed by a computer may cause the computer to perform a method for a communications device operable by a calling party. The method may include receiving an identifier associated with a called device from the calling party, and receiving an input command to establish a communications session with the called device from the calling party. The method may further include, after the receiving of the input command, attempting to establish the communications session with the called device, and transmitting the identifier to a called-party analyzer. The called-party analyzer, in response to receiving the identifier, may generate a reputation value based on analysis of data originating from at least one of: (i) a communications service provider, (ii) a caller-name lookup service provider, and (iii) an identity information provider. The reputation value may be indicative of a likelihood that at least one of the called device and a called party associated with the called device is involved in attempting to establish unwanted communications sessions, and the called-party analyzer may transmit the reputation value destined for the communications device. The method further includes receiving the reputation value originating from the called-party analyzer and causing an output generated based on the reputation value on an output the communications device.

DETAILED DESCRIPTION

Figure 1:
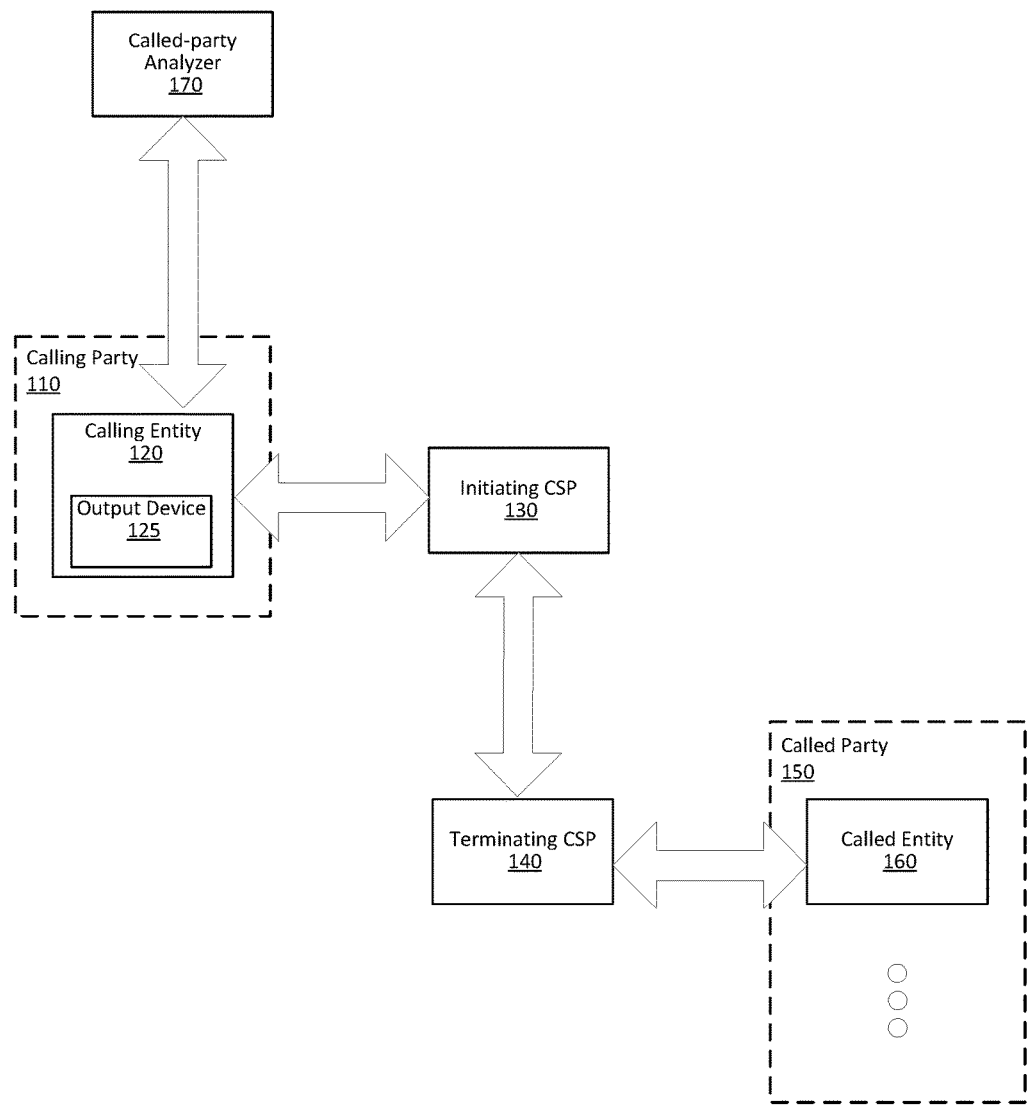
FIG. 1 illustrates an example of a communications system in accordance with the disclosed embodiments.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Overview

Aspects of the disclosure pertain to systems and methods for causing display of a visual indicator on a screen of a communications device operable by a calling party. The visual indicator may be generated by the communications device based on a reputation value received from a called-party analyzer, and the reputation value may be indicative of a likelihood that the called party is involved in placing unwanted calls (e.g., robocalls, scam call, and/or unsolicited marketing calls). Accordingly, the disclosed systems and methods may protect consumers from initiating communications sessions with parties that are likely to be involved in making unwanted calls.

In an example scenario, a consumer may receive an urgent message on his or her cellular phone requesting a call back to a certain phone number. After the consumer enters the phone number on his or her cellular phone, the cellular phone may receive a reputation value associated with the phone number from a called-party analyzer. If the received reputation value associated is outside a predetermined range of values, the cellular phone may display an alert and/or prevent the consumer from placing the call to the phone number. In this example scenario, the reputation value may be generated by the called-party analyzer based on analysis of data from various sources. Such data sources may include, for example, call records maintained by communications service providers (e.g., cellular phone carriers) and Calling NAMe (CNAM) query records maintained by CNAM lookup service providers.

In another example, after a consumer tries to call a phone number of a business he or she found on a website with a cellular phone, the cellular phone may receive a reputation value associated with the phone number from a called-party analyzer. The called-party analyzer may have generated the reputation value at least in part based on ratings available on, for example, Better Business Bureau (BBB). Thus, if the business has a low rating on BBB, the cellular phone may display an alert before the call is placed.

In yet another example, after a consumer tries to call a restaurant to place a delivery order, the cellular phone may receive a reputation value associated with the phone number from a called-party analyzer. The called-party analyzer may have generated the reputation value at least in part based on the restaurant's health inspection records. Thus, if the restaurant has failed a health inspection recently, the cellular phone may display an alert before the call is placed.

Examples of an Operating Environment

FIG. 1 illustrates an example of a communications system 100 in which concepts consistent with the principles of the invention may be implemented. As shown in FIG. 1, system 100 includes a calling entity 120 associated with a calling party 110; an initiating communications service provider (CSP) 130 associated with calling entity 120 and/or calling party 110 (e.g., calling entity 120's cellular carrier); a called entity 160 associated with called party 150; a terminating CSP 140 associated with called entity 160 and/or called party 150 (e.g., landline-service provider or voice-over internet protocol (VoIP) provider); and a called-party analyzer 170.

Calling Entity/Called Entity

Calling entity 120 may be any communications device that has a capability to attempt at establishing a communications session with called entity 160. For example, calling entity 120 may be a telephone capable of placing a voice call to another phone. In another example, calling entity 120 may be a tablet device capable of placing a video-based call to another compatible, video-capable device. In yet another example, calling entity 120 may be a text-messaging device capable of transmitting text-based messages destined for another compatible, text-messaging device.

In the above examples, a communications session may be established, for example, after the call is accepted by the called phone or device, or after the message is successfully delivered to, and/or accepted by, the destined device. In some embodiments, the communications session may be accepted by called entity 160 without an intervention by called party 150. For example, a cellular phone may be configured to automatically answer an incoming call.

However, attempting to establish a communications session by calling entity 120 does not guarantee that the communications session is established. For example, a landline phone receiving a call from calling entity 120 may be disconnected from the landline, or no one may be near the landline phone to accept the incoming call. In another example, a video-capable device receiving a video-based call from calling entity 120 may not support the protocol used by calling entity 120 and thus automatically rejecting the call. Alternatively, called party 150 may actively decline to participate in the video-based call. In yet another example, a text-messaging device receiving a text message from calling entity 120 may be disconnected from the communications network or configured to decline incoming messages.

In some embodiments, calling entity 120 may be further capable of participating in the established communications session with called entity 160. For example, after the communications session is established, calling entity 120 may be capable transmitting and receiving data (e.g., video, audio, and/or text data) to and from called entity 160 via the established communications session. In some embodiments, however, an entity other than calling entity 120 may participate in the communications session after it is established. In one example, calling entity 120, such as a smart watch, may attempt at establishing a communications session (e.g., by dialing a phone number). But, after the communications session is established (e.g., after the call is accepted by the called entity 160), another entity (e.g., a smart television) may participate in the established communications session by transmitting and receiving video/voice data via the established communications session.

Correspondingly, called entity 160 may be any communications device capable of establishing a communications session with calling entity 120. For example, called entity 160 may be a telephone that can receive calls placed by calling entity 120. In another example, called entity 160 may be a video-capable device implementing protocols compatible with video-based calls placed by calling entity 120. In yet another example, called entity 160 may be a text-messaging device participating in the same text-messaging platform as calling entity 120.

A communications session may be an audio-based, a video-based (e.g., recorded and/or rendered), and/or a text-based communications session. In some embodiments, a communications session may include a plurality of sub-communications sessions. For example, a communications session may include an audio-based and a video-based sub-communications sessions. In another example, a communications session may include an audio-based, a video-based, and a text-based sub-communications sessions.

In system 100, calling entity 120 may include, and/or connected to, at least one output device 125. In some embodiments, calling entity 120 may include, and/or connected to, one or more visual output devices, such as, but not limited to, a screen, a light-based indicator (e.g., an LED light), a projector, and a virtual-reality headset. Alternatively, or additionally, calling entity 120 may include, and/or connected to, one or more audio output devices, such as, but not limited to, a speaker, a headphone, and an audio system (e.g., audio receiver/amplifier). Additionally, or additionally, calling entity 120 may include, and/or connected to, a tactile display (e.g., braille device).

In some embodiments, at least one of calling entity 120 and called entity 160 may be a portable communications device, such as a cellular phone, a tablet, a laptop, or a smart watch. In some embodiments, at least one of calling entity 120 and called entity 160 may be a customer support system operable by one or more customer support representatives to place and/or receive calls to and/or from customers. In some embodiments, at least one of calling entity 120 and called entity 160 may be an internet-of-things (IoT) device and/or a smart home appliance. For example, calling entity 120 and/or called entity 160 may be an artificial-intelligence (AI) assistance unit (e.g., Amazon Echo, Google Home, etc.) or an AI-enabled smart appliance. In some embodiments, at least one of calling entity 120 and called entity 160 may include a plurality of entities. For example, calling entity 120, such as a customer support system, may include a telephone and a computer. In this example, the computer may be connected to the telephone and configured to control the telephone (e.g., causing the telephone dial a number, transfer a call, and/or record a call).

In some embodiments, an identifier may be associated with called entity 160. The identifier associated with called device 160 may include, for example, a phone number of called device 160 and a device identifier associated with called device 160 (e.g., IP address, MAC address). In some embodiments, the identifier may further include an extension number.

Calling Party/Called Party

As shown in FIG. 1, calling entity 120 may be associated with at least one calling party 110, and called entity 160 may be associated with at least one called party 150. As used herein, a party may be one or more persons, one or more computers, and/or one or more organizations associated with an entity. For example, a party may be a registered owner of a cellular phone. In another example, a party may be an official representative of an organization that owns and/or maintains a device for making phone calls (e.g., a CTO of a company that operates a customer service call center). In yet another example, a party may be an organization that owns and/or maintains a computer program that answers or places phone calls (e.g., AI bot) on a voice-over internet protocol (VoIP) communications platform (e.g., a corporation that developed and/or operates a computer software used for robocalls).

In some embodiments, an identifier may be associated with called party 150. The identifier associated with called party 150 may include, for example, a username assigned to called party 150 and a phone number shared among multiple devices. In some embodiments, called party 150 may be associated with entities other than called entity 160. For example, called party 150 may be an operator of multiple portable communications devices (e.g., smartwatch, laptop, tablet, cellular phone), each with an assigned identifier. In some embodiments, such identifiers may be the same across a plurality of devices that are associated with called party 150.

Communications Service Providers (CSP)

Furthermore, in system 100, calling entity 120 may be associated with, and connected to, at least one communications service provider (CSP). Similarly, called entity 160 may be associated with, and connected to, at least one CSP. As used herein, a CSP may include one or more connected communication entities (e.g., a base station, a core network, routers, gateways, etc.), which collectively facilitate the associated entity to establish a communications session with other entities and to participate in the established communications session. As shown in FIG. 1, a CSP associated with calling entity 120 and used by calling entity 120 to attempt at establishing a communications session (e.g., by placing a call) is considered an initiating CSP 130. Correspondingly, as shown in FIG. 1, a CSP associated with called entity 160 is considered a terminating CSP 140.

In some embodiments, calling entity 120 may be a subscriber of initiating CSP 130. For example, calling entity 120 may be a cellular phone whose carrier is initiating CSP 130. In another example, calling entity 120 may be a VoIP client (e.g., Cisco VoIP phones) whose VoIP service provider is initiating CSP 130. Similarly, called entity 160 may be a subscriber of terminating CSP 140. For example, called entity 160 may be a cellular phone or a VoIP client, whose carrier or VoIP provider is terminating CSP 140. In some embodiments, initiating CSP 130 and terminating CSP 140 may be the same CSP. For example, calling entity 120 and called entity 160 may be subscribers of the same cellular service carrier or VoIP service provider.

In some embodiments, a CSP may facilitate the associated entity to participate in a communications session established with entities that are associated with a different CSP. For example, a first CSP may be connected to a second CSP (e.g., via the Internet, public switched telephone network (PSTN), and/or a private, dedicated network), and the first and second CSPs may facilitate routing of communications between two or more entities.

Additionally, or alternatively, a CSP may facilitate the associated entity to participate in a communications session established with other entities implementing a different communications technology. For example, a first CSP may be connected to a second CSP (e.g., via the Internet, public switched telephone network (PSTN), and/or a private, dedicated network), and the first and second CSPs may translate communications between two or more entities (e.g., one protocol/format to another). In this example, the first CSP may be a cellular phone service provider and the second CSP may be a landline service provider, thus enabling cellular phones subscribed to the first CSP to place and receive calls from landline phones subscribed to the second CSP.

In some embodiments, a CSP and the associated entity may be connected via a wired connection (e.g. fiber optics, telephone landline, coaxial). For example, a landline telephone may be connected to a landline service provider via a telephone landline connection. Additionally, or alternatively, a CSP and the associated entity may be connected via a wireless connection (e.g., Bluetooth, cellular radio). For example, a cellular phone may be connected to a cellular service provider via cellular radio connection. In some embodiments, a CSP may the associated entity may be connected by a combination of wired and wireless connections. For example, a VoIP device may be connected to a local router via a Wi-Fi connection, and the router may be connected to the VoIP service provider via a fiber optics connection.

Called-Party Analyzer

Further, as shown in FIG. 1, calling entity 120 may communicate with called-party analyzer 170. Called-party analyzer 170 may be any device capable of receiving an identifier (e.g., associated with an entity or a party) and transmitting a reputation value associated with the identifier. In some embodiments, called-party analyzer 170 may include a physical and/or a virtual server. In some embodiments, at least a portion of called-party analyzer 170 may be implemented on a cloud platform, such as, but not limited to, Amazon Web Service, Google Cloud, and Microsoft Azure.

In system 100, calling entity 120 may transmit the identifier to called-party analyzer 170 may be associated with called entity 160 and/or called party 150 (e.g., a phone number of called entity 160, a username associated with called entity 160 or called party 150, or a device identifier associated with called entity 160). In response, called-party analyzer 170 may generate a reputation value associated with called entity 160, called party 150, and/or other entities associated with called party 150, and transmit the reputation value to calling entity 120. In embodiments where at least a portion of called-party analyzer 170 is implemented on a cloud platform, the identifier may be transmitted to, and the reputation value may be received from, called-party analyzer 170 via one or more cloud interfaces such as REST and SOAP interfaces.

In some embodiments, the reputation value may be indicative of a likelihood that called entity 160, called party 150, and/or other entities associated with called party 150 is involved in attempting to establish unwanted communications sessions. For example, the reputation value may be indicative of a likelihood that the called entity 160, called party 150, and/or other entities associated with called party 150 is involved in making robocalls (i.e., automated and/or recorded calls). In another example, the reputation value may be indicative of a likelihood that called entity 160, called party 150, and/or other entities associated with called party 150 is involved in making scam calls. In yet another example, the reputation value may be indicative of a likelihood that the called entity 160, called party 150, and/or other entities associated with called party 150 is involved in making legitimate, but unsolicited, calls.

In some embodiments, called-entity analyzer 170 may transmit additional data to calling entity 120 in addition to the reputation value. Such data may be used by calling entity 120, together with the reputation value, to generate an output (e.g., visual indicator). For example, called-party analyzer 170 may transmit to calling entity 120, in addition to the reputation value, a confidence level associated with the reputation value and/or a description of the factors that affected the reputation value.

In system 100, calling entity 120 may generate an output on output device 125 based on the received reputation value. In embodiments where output device 125 includes a visual output device, the output may include a visual indicator. FIGS. 6A-6C, 7A-7B, 8A-8B, 9A-9B, 10, and 11A-11B illustrate numerous examples of visual indicators that may be generated by calling entity 120 and displayed on a screen of calling entity 120. In embodiments where output device 125 includes a virtual reality output device (e.g., virtual reality headset), the visual indicator may be displayed proximate to, or adjacent to, an avatar representing called entity 160 and/or called party 150. In embodiments where output device 125 includes an audio output device, the output may include a sound clip. For example, a sound clip of a siren may be generated on a speaker if the reputation value indicates that called party 150 is likely involved in a scam.

Figure 2:
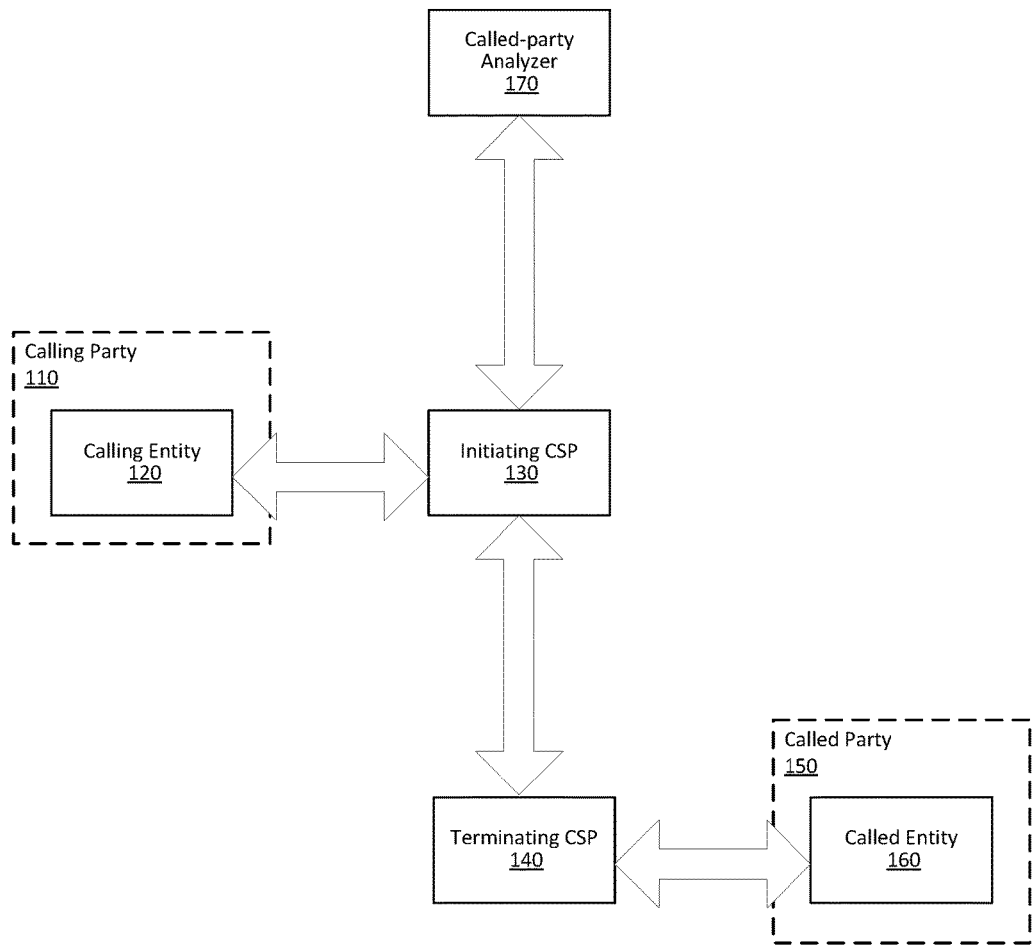
FIG. 2 illustrates another example of a communications system in accordance with the disclosed embodiments.

FIG. 2 illustrates another example of a communications system 200 in which concepts consistent with the principles of the invention may be implemented. System 200 is similar to system 100 of FIG. 1, except that called-party analyzer 170 of system 200 is connected to initiating CSP 130. Thus, in system 200, called-party analyzer 170 may receive the identifier associated with called entity 160 from called entity 120 via initiating CSP 130, and called entity 120 may receive the reputation value from called-party analyzer 170 via initiating CSP 130. In some embodiments, initiating CSP 130 may receive the identifier associated with called entity 160 from calling entity 120 as a part of a process to attempt at establishing a communications session with called entity 160. For example, as a part of the process to place a phone call, calling entity 120 may transmit the phone number of the called entity 160 to initiating CSP 130. Initiating CSP 130 may use the phone number to attempt at establishing a call with called entity 160 and to transmit the phone number to called-party analyzer 170.

In some embodiments, calling entity 120 may transmit the identifier via initiating CSP 130 but receive the reputation value from called-party analyzer 170 without involving initiating CSP 130. In some embodiments, calling entity 120 may transmit the identifier to called-party analyzer 170 without involving initiating CSP 130 but receive the reputation value via initiating CSP 130.

In some embodiments, called-party analyzer 170 may be a part of initiating CSP 130. In an example where called entity 120 is a cellular phone, called-party analyzer 170 may be a server owned and/or operated by called entity 120's cellular service carrier and connected to the carrier's base station and/or core network.

Figure 3:
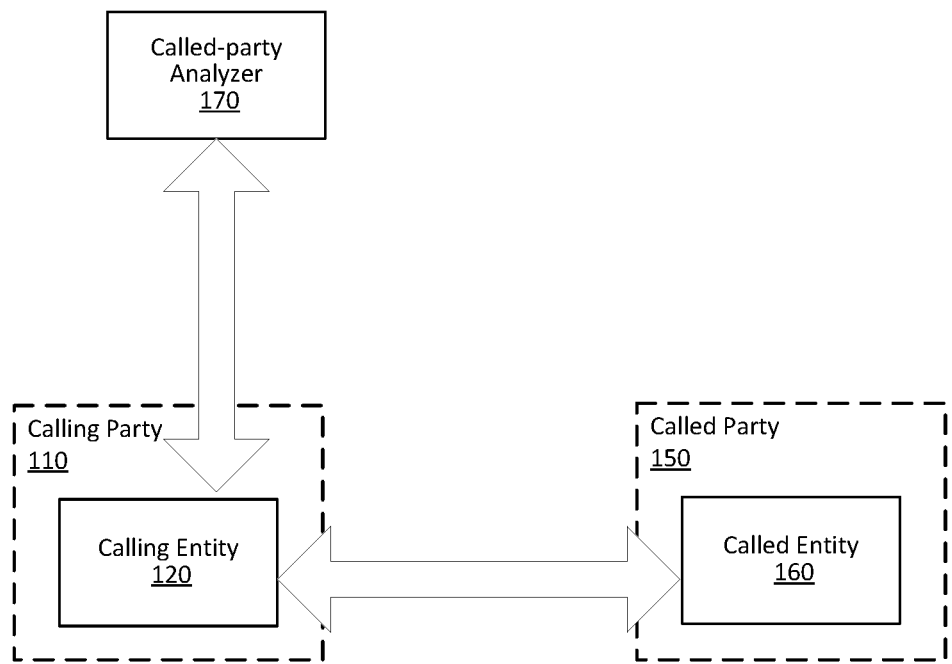
FIG. 3 illustrates yet another example of a communications system in accordance with the disclosed embodiments.

FIG. 3 illustrates yet another example of a communications system 300 in which concepts consistent with the principles of the invention may be implemented. System 300 is similar to system 100 of FIG. 1, except that calling entity 120 can communicate with called entity 160 without any CSPs. For example, both calling entity 120 and called entity 160 may be connected to the Internet and a communications session between the two entities may be established over the Internet.

An Example of a Calling Entity

Figure 4:
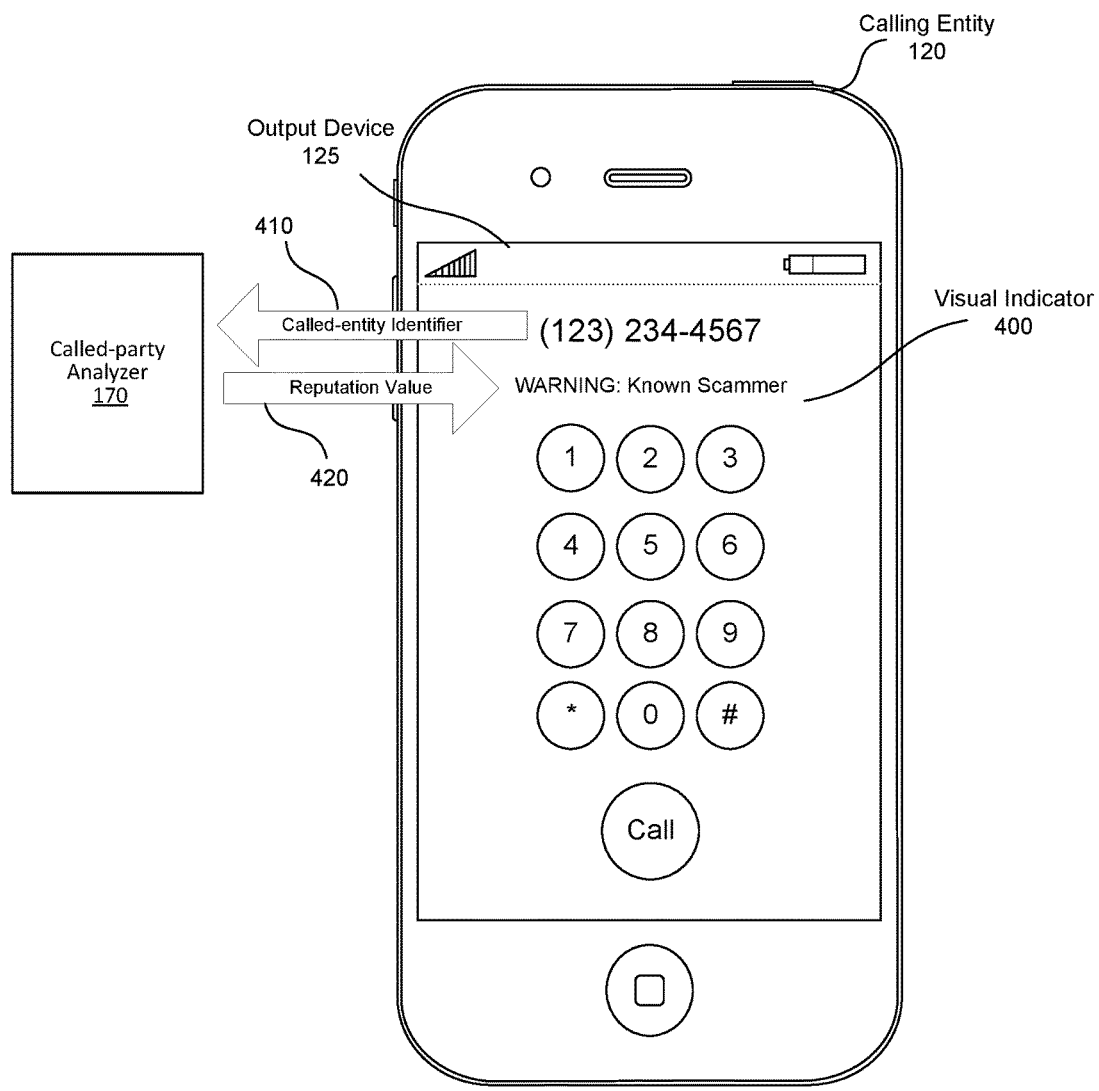
FIG. 4 illustrates an example of a calling entity in accordance with the disclosed embodiments.

FIG. 4 illustrates an example of calling entity 120 that includes a screen 125 displaying a called-entity identifier 410 and a visual indicator 400 in accordance with the disclosed embodiments.

FIG. 4 illustrates calling entity 120 after a user has provided called-entity identifier 410 (e.g., a phone number) to calling entity 120 (e.g., using a number pad shown in FIG. 4). After called-entity identifier 410 is provided to calling entity 120, calling entity 120 may transmit called-entity identifier 410 to called-party analyzer 170. In response, as discussed above in reference to FIG. 1, called-party analyzer 170 may generate a reputation value 420 associated with called entity 160, called party 150, and/or other entities associated with called party 150, and transmit the reputation value 420 to calling entity 120.

After the reputation value is received, calling entity 120 may generate a visual indicator 400 on output device 125 of calling entity 120 based on the received reputation value 420. Visual indicator 400 may inform a user of calling entity 120 with a likelihood that called entity 160, called party 150, and/or other entities associated with called party 150 is involved in attempting to establish unwanted communications sessions. For example, in FIG. 4, visual indicator 400 includes a text "WARNING: Known Scammer," warning the user of calling entity 120 that called entity 160, called party 150, and/or other entities associated with called party 150 is likely involved in scam calls.

An Example of a Called-Party Analyzer

Figure 5:
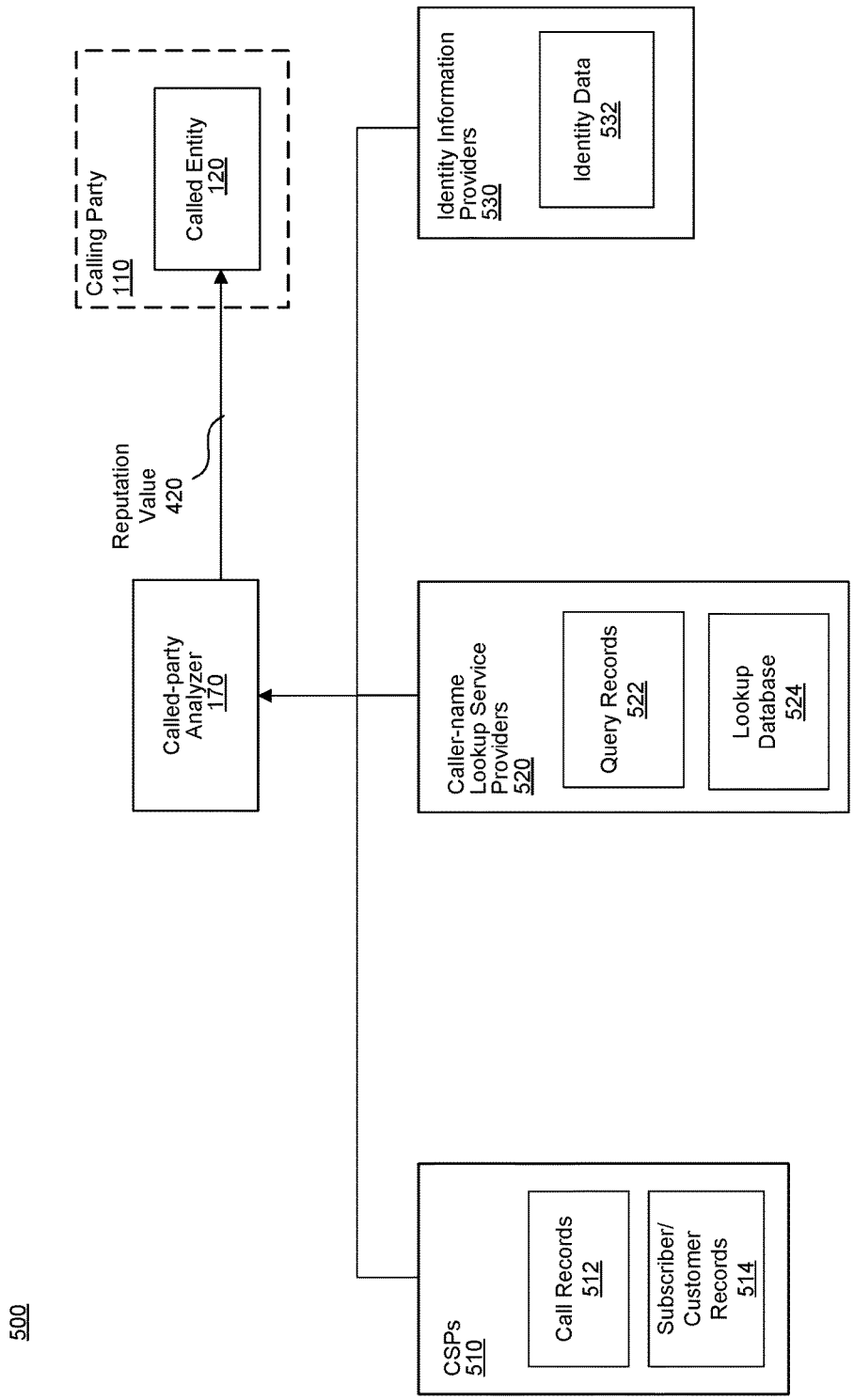
FIG. 5 illustrates entities and data used by a called-party analyzer for generating a reputation value in accordance with the disclosed embodiments.

FIG. 5 illustrates entities and data used by called-party analyzer 170 for generating reputation value 420 in accordance with the disclosed embodiments. As shown in FIG. 5, called-party analyzer 170 may have access to data maintained by a number of entities, such as, but not limited to, one or more CSPs 510, one or more caller-name lookup service providers 520, and/or identity information providers 530.

Communications Service Providers' Data

In some embodiments, as shown in FIG. 5, called-party analyzer 170 may have access to call records 512 maintained by one or more CSPs 510 (which may or may not include initiating CSP 130 and/or terminating CSP 140). For example, called-party analyzer 170 may have access to data maintained by a cellular communications provider that includes records of calls placed and received by subscribers of the cellular communications provider. In this example, called-party analyzer 170 may request, from CSP 510, call records 512 that involve called entity 160, called party 150, and/or other entities associated with called party 150 (e.g., call records where called entity 160 is the caller).

After receiving the requested call records 512, called-party analyzer 170 may generate reputation value 420 at least based on analysis of the received call records. For example, called-party analyzer 170 may generate reputation value 420 at least based on an average call length for calls involving called entity 160, called party 150, and/or other entities associated with called party 150. A short average call length (e.g., shorter than a few seconds) may indicate that a large portion of the calls involving called entity 160, called party 150, and/or other entities associated with called party 150 are unwanted calls. Thus, the generated reputation value may indicate an increased likelihood that called entity 160, called party 150, and/or other entities associated with called party 150 is involved in placing unwanted calls. Additionally, or alternatively, called-party analyzer 170 may analyze the call records to determine a frequency/number of calls placed by called entity 160, called party 150, and/or other entities associated with called party 150. A frequency/number of calls higher than a predetermined number (e.g., more than 1000 calls a day) may indicate an increased likelihood that called entity 160, called party 150, and/or other entities associated with called party 150 is involved in placing unwanted calls. Thus, the generated reputation value may indicate an increased likelihood that called entity 160, called party 150, and/or other entities associated with called party 150 is involved in placing unwanted calls. Furthermore, called-party analyzer 170 may analyze the call records to determine whether there exists a pattern in the identifiers associated with the called entities. For example, if the phone numbers called by called entity 160 are in a sequence (e.g., 555-0001, 555-0002, 555-0003, etc.), the generated reputation value may indicate an increased likelihood that called entity 160, called party 150, and/or other entities associated with called party 150 is involved in placing unwanted calls.

In some embodiments, called-party analyzer 170 may request that CSP 510 at least partially analyze call records 512 involving called entity 160, called party 150, and/or other entities associated with called party 150 and that CSP 510 provide called-party analyzer 170 with a result of the analysis. For example, called-party analyzer 170 may request that CSP 510 determine an average call length for calls involving called entity 160, called party 150, and/or other entities associated with called party 150. In another example, called-party analyzer 170 may request that CSP 510 determine a frequency/number of calls placed by called entity 160, called party 150, and/or other entities associated with called party 150. In these embodiments, called-party analyzer 170 may generate reputation value 420 at least based on the analysis performed by the CSPs 510.

In some embodiments, as shown in FIG. 5, called-party analyzer 170 may have access to subscriber/customer records 514 maintained by one or more CSPs 510. For example, called-party analyzer 170 may have access to data maintained by a cellular communications provider that includes subscribers/customers' identity and their billing/purchase history. In this example, called-party analyzer 170 may request, from one or more CSPs 510 that are associated with called entity 160, subscriber/customer records 514 relating to called entity 160, called party 150, and/or other entities associated with called party 150. After receiving the requested records, called-party analyzer 170 may use the requested data to determine a likelihood that called entity 160, called party 150, and/or other entities associated with called party 150 is involved in placing unwanted calls. In one example, a large number different names or identifiers (e.g., phone numbers) associated with called entity 160, called party 150, and/or other entities associated with called party 150 may indicate an increased likelihood that called entity 160, called party 150, and/or other entities associated with called party 150 is involved in placing unwanted calls. In another example, an inclusion of one or more key words (e.g., "Marketing," "Credit Cards," etc.) in the associated names may indicate an increased likelihood that called entity 160, called party 150, and/or other entities associated with called party 150 is involved in placing unwanted calls. In yet another example, an absence of records relating to called entity 160, called party 150, and/or other entities associated with called party 150 may indicate an increased likelihood that called entity 160, called party 150, and/or other entities associated with called party 150 is involved in placing unwanted calls.

Furthermore, a short tenure of called entity 160, called party 150, and/or other entities associated with called party 150 at a CSP may indicate an increased likelihood that called entity 160, called party 150, and/or other entities associated with called party 150 is involved in placing unwanted calls. Moreover, having multiple short tenures at multiple CSPs 510 may also indicate an increased likelihood that called entity 160, called party 150, and/or other entities associated with called party 150 is involved in placing unwanted calls.

In addition, delinquent accounts associated with called entity 160, called party 150, and/or other entities associated with called party 150 at CSPs 510 may indicate an increased likelihood that called entity 160, called party 150, and/or other entities associated with called party 150 is involved in placing unwanted calls.

Caller-Name Lookup Service Providers' Data

In some embodiments, as shown in FIG. 5, called-party analyzer 170 may have access to query records 522 maintained by one or more caller-name lookup service providers 520. For example, called-party analyzer 170 may have access to a Caller NAMe (CNAM) database 524 and/or CNAM query records 522 maintained by a CNAM service provider. A CNAM database may include, for example, a list of phone numbers and a name associated with each of the phone numbers. Each query record in CNAM query records 522 may include, for example, a phone number that was queried and a phone number of the calling phone. A query record may further include the name that was returned to the calling phone in response to the query.

In the above example, called-party analyzer 170 may generate reputation value 420 at least based on CNAM query records 522 and/or CNAM database 524. For example, called-party analyzer 170 may generate reputation value 420 at least based on a frequency/number of queries where the phone number of the calling phone matches the phone number of called entity 160 or other entities associated with called party 150. In another example, called-party analyzer 170 may generate reputation value 420 at least based on a frequency/number of queries where the queried phone number matches the phone number of called entity 160 or other entities associated with called party 150. A frequency/number of queries higher than a predetermined number (e.g., 1000 queries a day) may indicate an increased likelihood that called entity 160, called party 150, and/or other entities associated with called party 150 is involved in placing unwanted calls. In another example, called-party analyzer 170 may generate reputation value 420 at least based on a number of different names that are associated with called entity 160, called party 150, and/or other entities associated with called party 150 in CNAM database 524. A large number of different names associated with called entity 160, called party 150, and/or other entities associated with called party 150 may indicate an increased likelihood that called entity 160, called party 150, and/or other entities associated with called party 150 is involved in placing unwanted calls. In another example, an inclusion of one or more key words (e.g., "Marketing," "Credit Cards," etc.) in the associated names may indicate an increased likelihood that called entity 160, called party 150, and/or other entities associated with called party 150 is involved in placing unwanted calls.

In some embodiments, called-party analyzer 170 may request that caller-name lookup service provider 520 at least partially analyze query records 522 and/or a lookup database 524 and that caller-name lookup service provider 520 provide called-party analyzer 170 with a result of the analysis. Called-party analyzer 170 may generate reputation value 420 at least based on the analysis performed by the caller-name lookup service provider 520.

Identity Information Providers' Data

In some embodiments, as shown in FIG. 5, called-party analyzer 170 may have access to identity data 532 maintained by one or more identity information providers 530 known and/or trusted by called-party analyzer 170. In one example, identity data 532 may include identity data 532 associated with one or more parties/entities, which may have been vetted and/or verified by identity information provider 530 (e.g., by verifying proof of identity presented by a party/entity, and/or performing a background search of the party/entity). In another example, identity data 532 may include crowd-sourced identity data 532.

In these embodiments, called-party analyzer 170 may generate reputation value 420 at least based on the identity data 532 maintained by the identity information providers 530. For example, the presence of records relating to called entity 160, called party 150, and/or other entities associated with called party 150 in identity data 532 of identity information provider 530 may indicate a decreased likelihood that called entity 160, called party 150, and/or other entities associated with called party 150 is involved in placing unwanted calls. Similarly, an absence of records relating to called entity 160, called party 150, and/or other entities associated with called party 150 in identity data 532 of identity information provider 530 may indicate an increased likelihood that called entity 160, called party 150, and/or other entities associated with called party 150 is involved in placing unwanted calls.

In some embodiments, the presence of records relating to called entity 160, called party 150, and/or other entities associated with called party 150 in identity data 532 of identity information provider 530 may generate a predetermined reputation value 420 indicating that called entity 160 may be trusted. In these embodiments, analysis based on data from other data sources may not be used to generate when generating reputation value 420.

In contrast, in some embodiments, an absence of called entity 160, called party 150, and/or other entities associated with called party 150 in an identity information provider 530 may generate a predetermined reputation value 420 indicating that called entity 160 may not be trusted. In these embodiments, analysis based on data from other data sources may not be used to generate reputation value 420.

In another example, reputation value 420 may be generated at least based on crowed-sourced identity data maintained by identity information providers 530.

In some embodiments, called-party analyzer 170 may generate reputation value 420 based on data maintained by one of CSPs 510, caller-name lookup service provider 520, and identity information providers 530. In some embodiments, called-party analyzer 170 may generate reputation value 420 based on data maintained by two or more of CSPs 510, caller-name lookup service provider 520, and identity information providers 530.

In some embodiments, called-party analyzer 170 may generate reputation value 420 by receiving intermediate data from one of the data sources (e.g., CSPs 510, caller-name lookup service provider 520, and identity information providers 530) and using the intermediate data to receove additional data from other data sources. For example, called-party analyzer 170 may transmit an identifier associated with called entity 160 to a CSP 510 and receive in response additional identifiers associated with called entity 160 (e.g., identifiers associated with called party 150 and other entities associated with called party 150). Subsequently, the additional identifiers may be used to receive additional data from caller-name lookup service providers 520 and/or identity information providers 530.

Examples of Visual Indicators

Figure 6A:
FIGS. 6A-6C, 7A-7B, 8A-8B, 9A-9B, 10, and 11A-11B illustrate examples of visual indicators displayed on a screen of a calling entity in accordance with the disclosed embodiments.
Figure 6B:
Figure 6C:

FIGS. 6A-6C illustrate examples of visual indicators 400 displayed on a screen of calling entity 120 in accordance with the disclosed embodiments. Visual indicators 400 of FIGS. 6A and 6B are displayed on a screen of calling entity 120 after an identifier associated with called entity 160 is provided to calling entity 120, but before calling entity 120 receives an input command to establish a communication session (i.e., before the call button is pressed). In FIG. 6A, visual indicator 400 may include a checkmark graphic, indicating that it is unlikely that called entity 160, called party 150, and/or other entities associated with called party 150 is involved in placing unwanted calls. In FIG. 6B, visual indicator 400 may include a cross-mark graphic, indicating that it is likely that called entity 160, called party 150, and/or other entities associated with called party 150 is involved in placing unwanted calls. Visual indicator 400 of FIG. 6C is similar to visual indicator 400 of FIG. 6A, except that visual indicator 400 of FIG. 6C is displayed after calling entity 120 receives an input command to establish a communication session (i.e., after the call button is pressed).

Figure 7A:
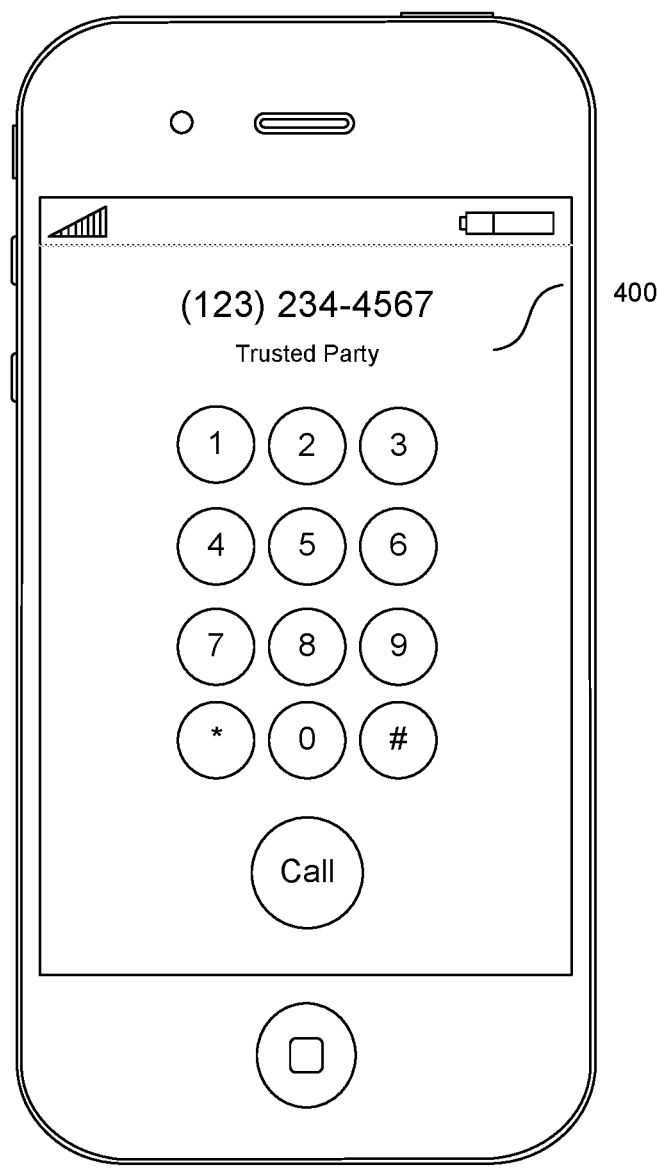
Figure 7B:
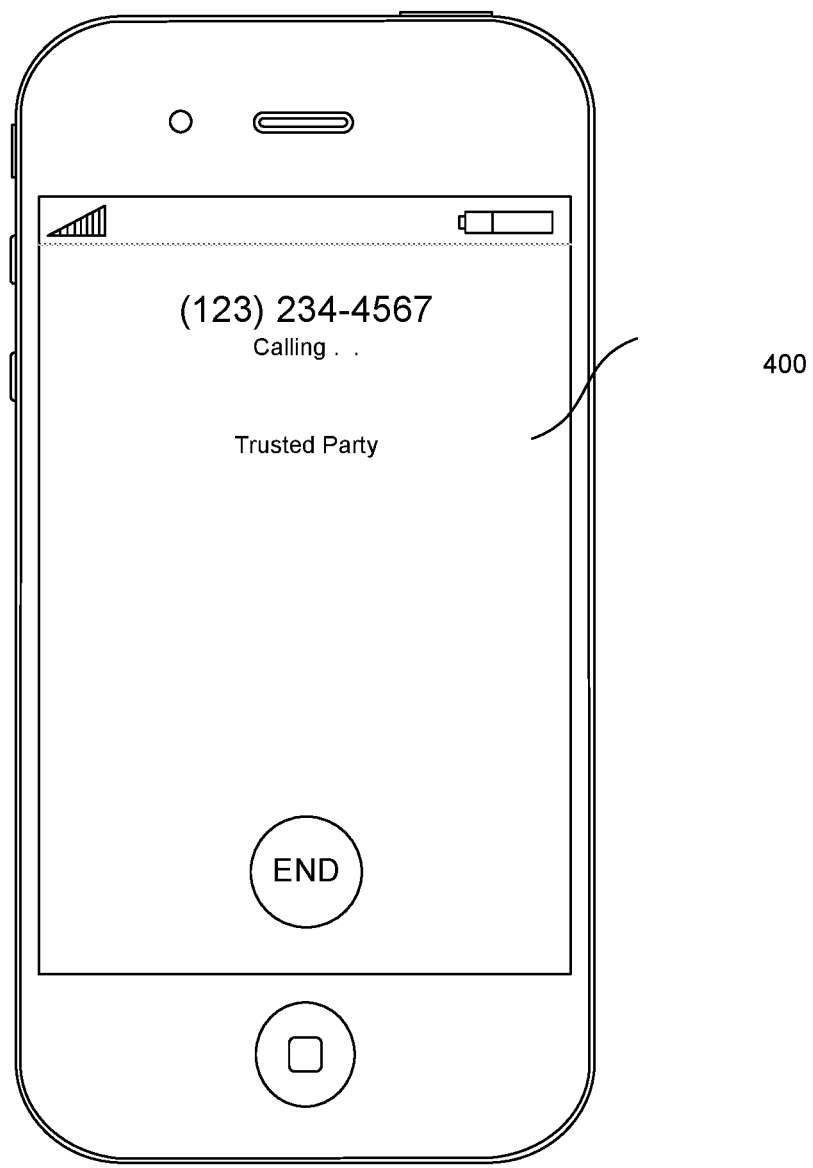

FIGS. 7A-7B illustrate examples of visual indicators 400 displayed on a screen of calling entity 120 in accordance with the disclosed embodiments. Visual indicators 400 of FIGS. 7A and 7B are similar to visual indicators of FIGS. 6A and 6C, except that visual indicators of FIGS. 7A and 7B include text-based visual indicators 400.

Figure 8A:
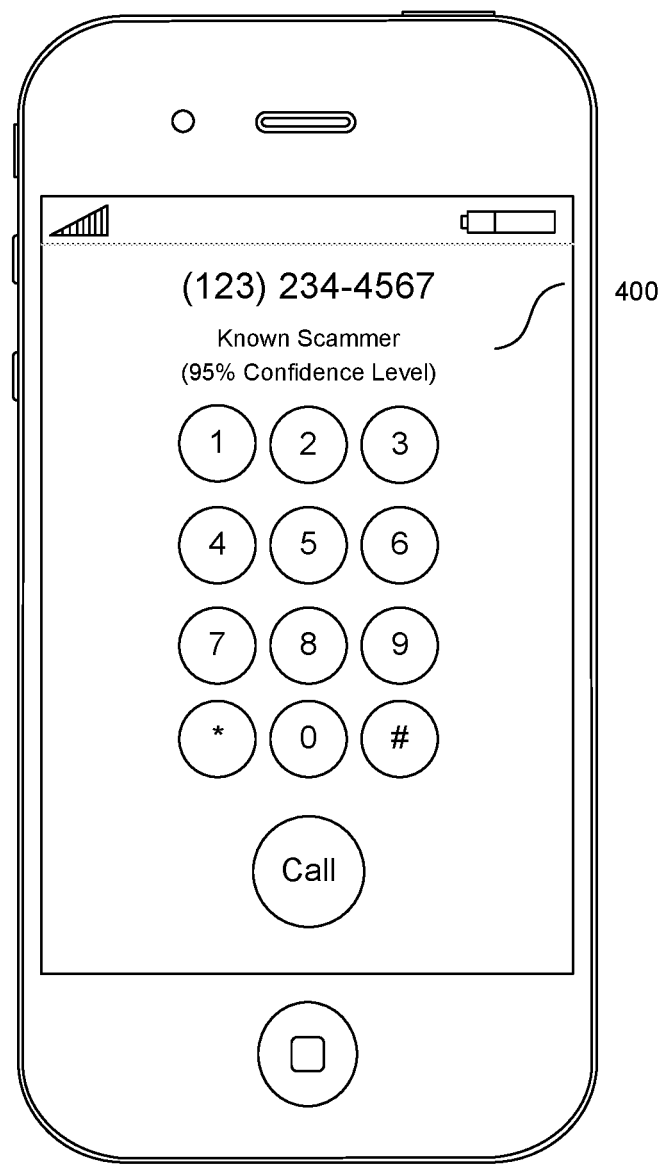
Figure 8B:
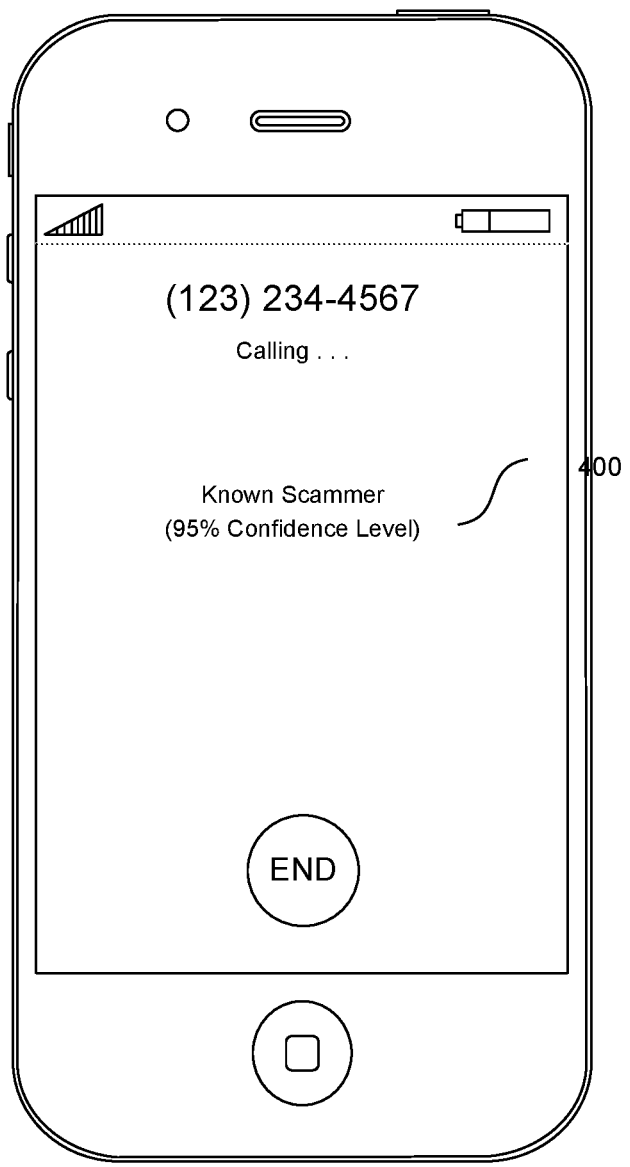

FIGS. 8A-8B illustrate examples of visual indicators 400 displayed on a screen of calling entity 120 in accordance with the disclosed embodiments. Visual indicators 400 of FIGS. 8A and 8B are similar to visual indicators of FIGS. 7A and 7B, except visual indicators of FIGS. 8A and 8B further include confidence levels.

Figure 9A:
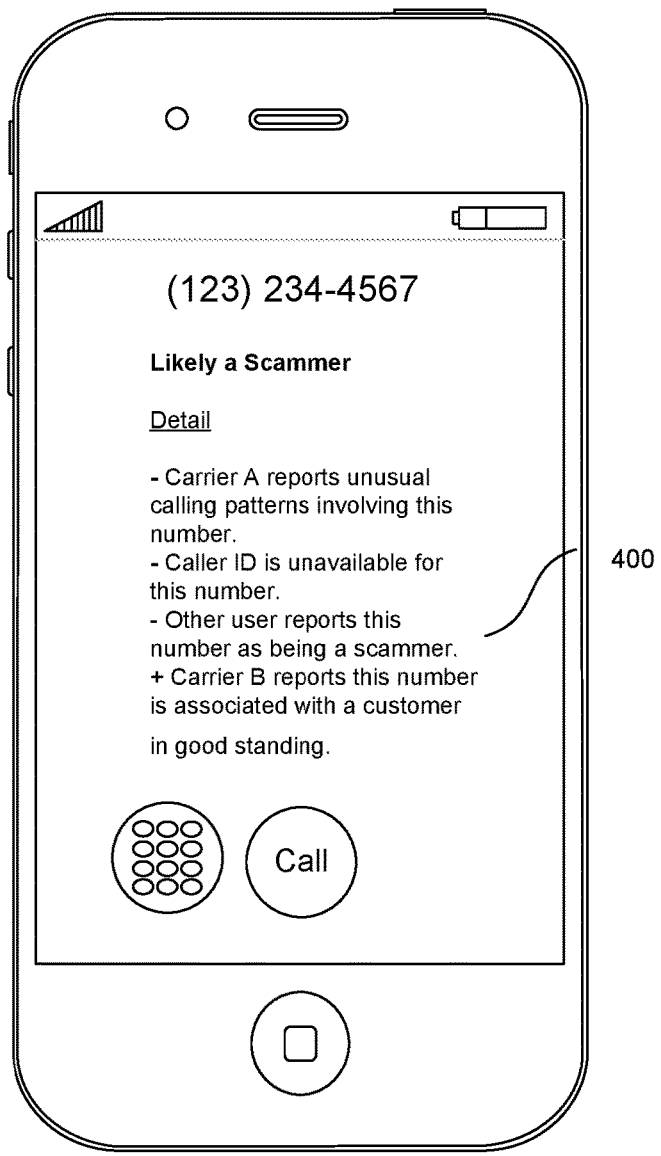
Figure 9B:
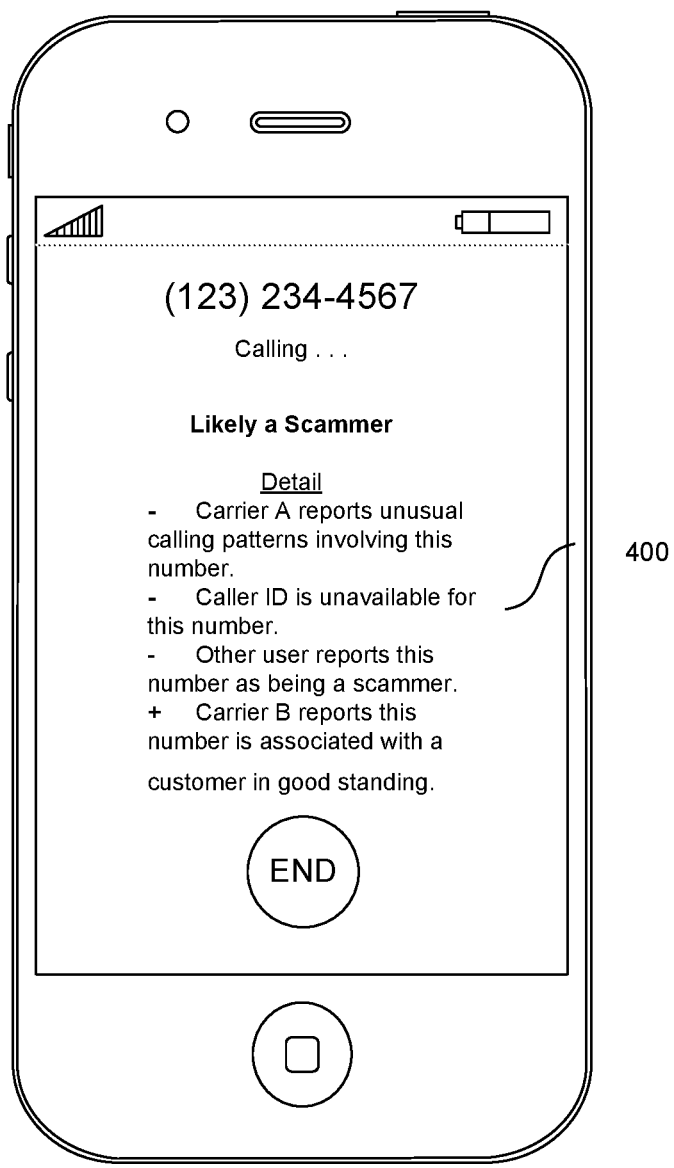

FIGS. 9A-9B illustrate examples of visual indicators 400 displayed on a screen of calling entity 120 in accordance with the disclosed embodiments. Visual indicators 400 of FIGS. 8A-8B are similar to visual indicators 400 of FIGS. 7A and 7B, except visual indicators of FIGS. 8A and 8B further include brief explanations and/or factors that influenced the reputation value.

Figure 10:
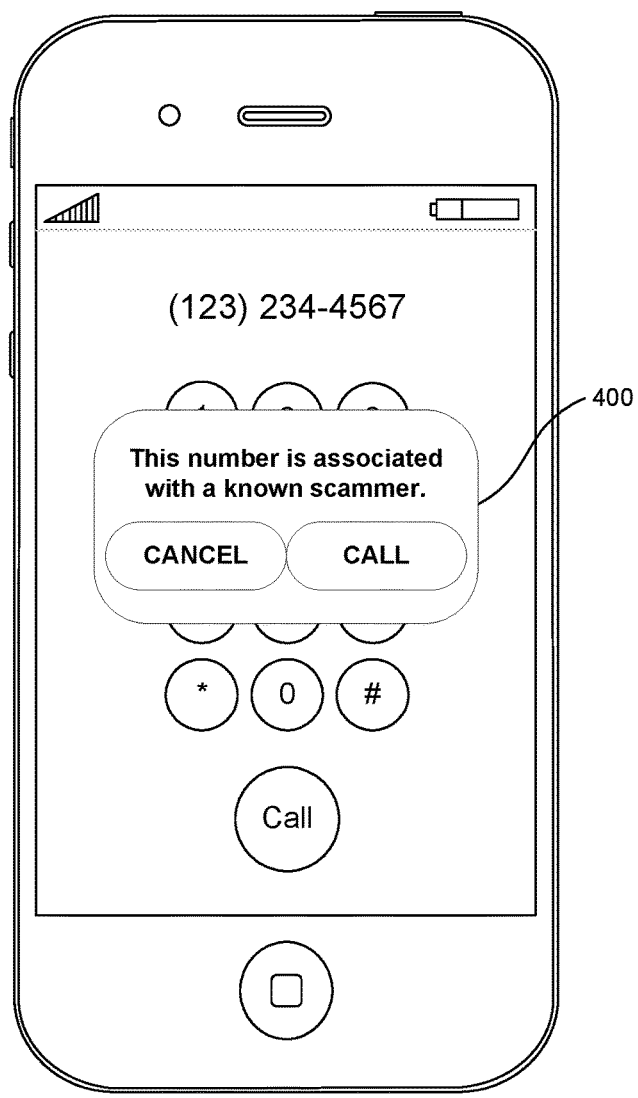

FIG. 10 illustrates an example of visual indicator 400 displayed a screen of calling entity 120 in accordance with the disclosed embodiments. In FIG. 10, visual indicator 400 is displayed after calling entity 120 receives an input command to establish a communication session (i.e., after the call button is pressed), but before calling entity 120 attempts establish the communication session. In one example, as shown in FIG. 10, visual indicator 400 may be shown as a notification. Further, a user of calling entity 120 may be provided a choice to proceed and attempt to establish the communication, or to cancel the attempt.

Figure 11A:
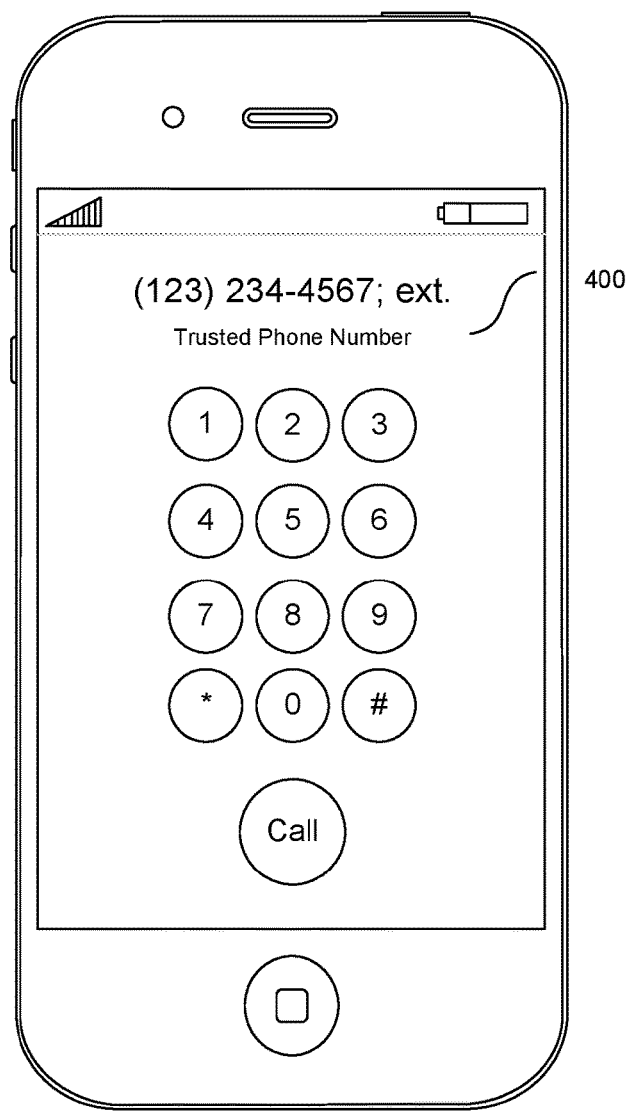
Figure 11B:
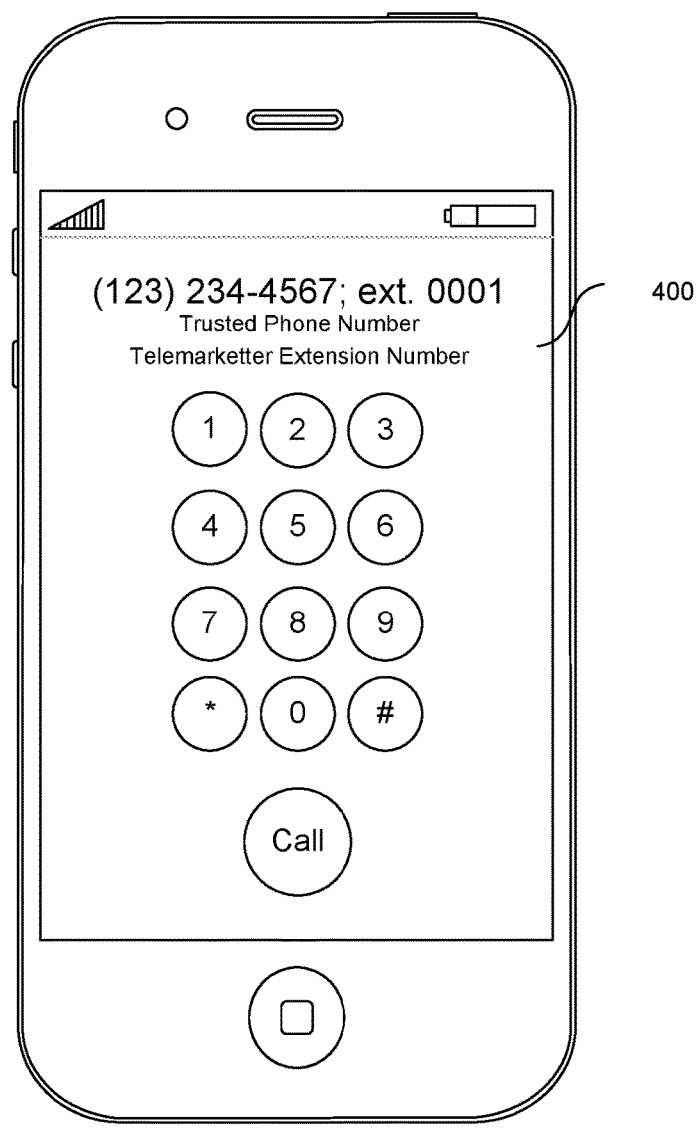

FIGS. 11A-11B illustrate examples of visual indicators 400 displayed on a screen of calling entity 120 in accordance with the disclosed embodiments. Visual indicator 400 of FIG. 11A is displayed on a screen of calling entity 120 after a portion of an identifier associated with called entity 160 is provided to calling entity 120 (e.g., a phone number without the extension number). Thus, FIG. 11 shows visual indicator 400 generated based on a reputation value associated with the portion of the identifier associated with called entity 160. Visual indicator 400 of FIG. 11B is displayed on the screen of calling entity 120 after the remaining portion of an identifier associated with called entity 160 is provided to calling entity 120 (e.g., a phone number and an extension number). Thus, visual indicator 400 is regenerated based on a reputation value associated the entire identifier associated with called entity 160.

An Example of a Process

Figure 12:
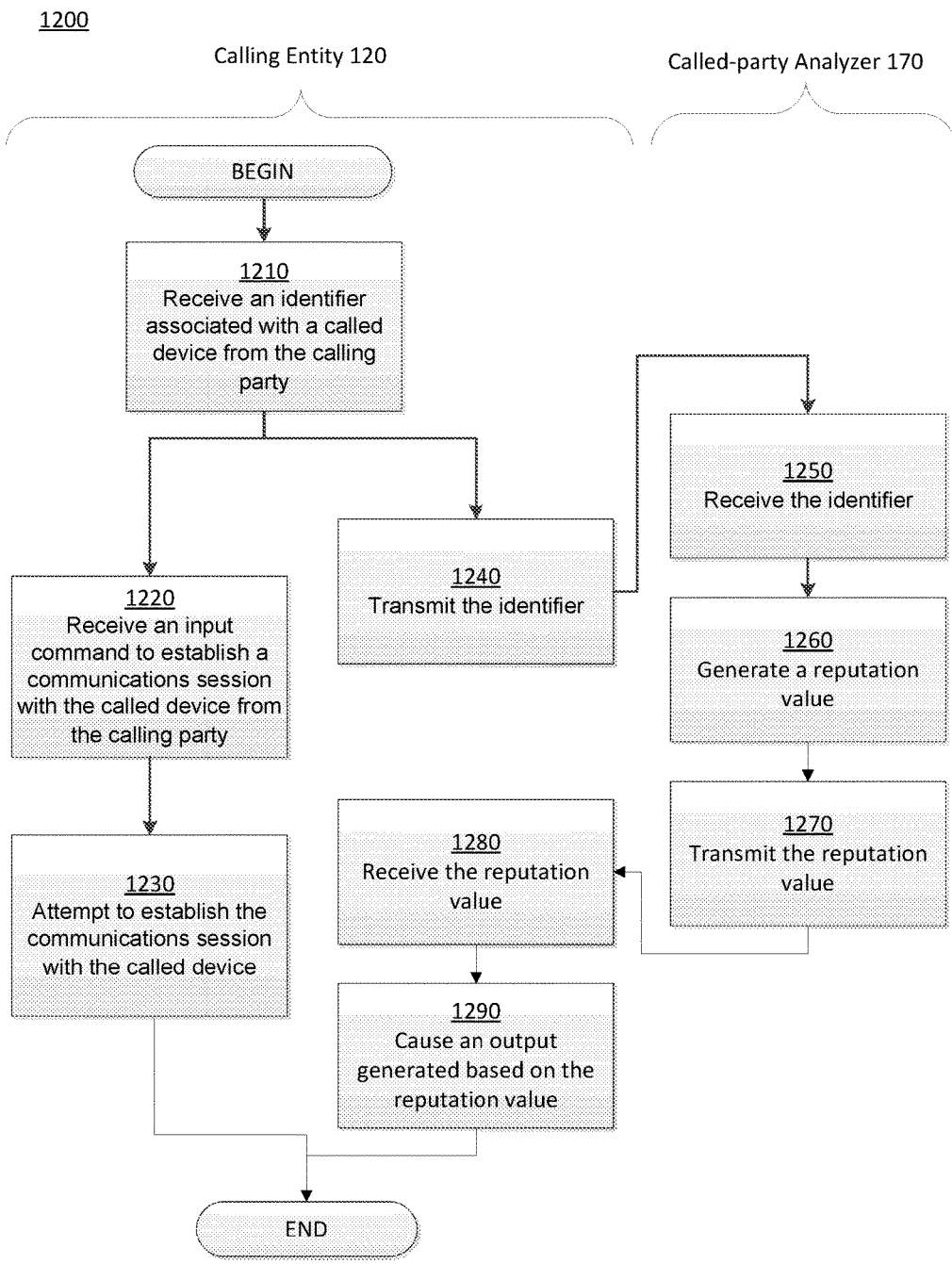
FIG. 12 illustrate an example of a method for causing display of a visual indicator in accordance with the disclosed embodiments.

FIG. 12 illustrates a process 1200 implemented by a communications device 120 operable by a calling party 110 in accordance with the disclosed embodiments.

In some embodiments, communications device 120 may be a portable communications device, such as a cellular phone, a tablet, a laptop, or a smart watch. In some embodiments, communications device 120 may be a customer support system operable by one or more customer support representatives to place and/or receive calls to and/or from customers. In some embodiments, communications device 120 may be an internet-of-things (IoT) device and/or a smart home appliance. For example, calling entity 120 and/or called entity 160 may be an artificial-intelligence (AI) assistance unit (e.g., Amazon Echo, Google Home, etc.) or an AI-enabled smart appliance. In some embodiments, communications device 120 may include a plurality of entities. For example, communications device 120 such as a customer support system may include a telephone and a computer. The computer may be connected to the telephone and configured to control the telephone (e.g., causing the telephone dial a number, transfer a call, and/or record a call).

At a step 1210, communications device 120 may receive an identifier associated with a called device 160 from calling party 110. The identifier associated with called device 160 may include, for example, a phone number of called device 160, a username associated with called device 160, a device identifier associated with called device 160. In some embodiments, the identifier may further include an extension number. In some embodiments, communications device 120 may receive an identifier associated with a called device 160 from another device or another software executing on communications device 120. Additionally, or alternatively, the identifier may be associated with called party 150.

At a step 1320, communications device 120 may receive an input command to establish a communications session with called device 160 from calling party 110. In some embodiments, the receiving of the input command to establish a communication session may include receiving an input command from called party 110 to establish the communication session. For example, called party 110 may provide an input command to establish a communications session with called device 160 by entering a validly-formatted phone number using an input device of communications device 120. In another example, called party 110 may provide an input command to establish a communications session with called device 160 by entering a phone number and then pressing a "call" button on communications device 120. In some embodiments, called party 110 may include a user of communications device 120.

At a step 1230, communications device 120 may attempt to establish the communications session with called device 160.

At a step 1240, communications device 120 may transmit the identifier to a called-party analyzer 170. In some embodiments, communications device 120 may transmit the identifier to called-party analyzer 170 via a communications service provider (CSP). Further, in some embodiments, the CSP may be an initiating CSP 130 of the communications session.

At a step 1250, called-party analyzer 170 may receive the identifier. In some embodiments, called-party analyzer 170 may receive the identifier via a CSP. Further, in some embodiments, the CSP may be an initiating CSP 130 of the communications session.

At a step 1260, called-party analyzer 170, in response to receiving the identifier, may generate a reputation value 420 based on analysis of data originating from at least one of: (i) a communications service provider 510, (ii) a caller-name lookup service provider 520, and (iii) an identity information provider 530. The reputation value 420 may be indicative of a likelihood that at least one of called device 160 and a called party 150 associated with called device 160 is involved in attempting to establish unwanted communications sessions. In some embodiments, the reputation value may be indicative of a likelihood that at least one of called device 160, a called party 150 associated with the called device 160, and other devices associated with the called device 160 is involved in attempting to establish unwanted communications sessions.

In some embodiments, reputation value 420 may be generated at least based on analysis of data originating from one or more communications service providers 510. In some embodiments, one or more communications service providers 510 may perform at least a portion of the analysis. Further, in some embodiments, a communications service provider 510 may be one of: (i) a mobile wireless communications service provider, (ii) a landline service provider, (iii) a voice over IP (VoIP) service provider, and (iv) an instant messaging (IM) service provider. In some embodiments, the data originating from the communications service provider 510 may include records of past communications sessions (e.g., call records 512) involving at least one of the called device 160 and another device associated with the called party 150.

In some embodiments, the called device may be a subscriber of the communications service provider 510 and the data originating from the communications service provider 510 may include subscriber records 514 associated with the called device maintained by the communications service provider.

In some embodiments, the reputation value 420 may be generated at least based on analysis of data originating from one or more caller-name lookup service providers 520. In some embodiments, one or more caller-name lookup service providers 520 may perform at least a portion of the analysis. Further, the caller-name lookup service provider 520 may be a Caller ID Name (CNAM) database service provider.

In some embodiments, the data originating from the caller-name lookup service provider 520 may include records of caller-name lookup queries (e.g., CNAM query records 522) involving at least one of the called device 160 and other devices associated with the called party 150.

At a step 1270, called-party analyzer 170 may transmit the reputation value 420 destined for the communications device 120. In some embodiments, the reputation value 420 may be transmitted to calling device 120 via a CSP. Further, in some embodiments, the CSP may be an initiating CSP 130 of the communications session.

At a step 1280, communications device 120 may receive the reputation value 420 originating from the called-party analyzer 170. In some embodiments, the reputation value 420 may be received at communications device 120 via a CSP. Further, in some embodiments, the CSP may be an initiating CSP 130 of the communications session.

At a step 1290, communications device 120 may cause an output generated based on the reputation value 420 on an output device 125 of the communications device 120.

As discussed above in reference to FIG. 1, in embodiments where output device 125 includes a visual output device 125, the output may include a visual indicator 400 (see e.g., visual indicators 400 of FIGS. 6A-11B). In embodiments where output device 125 includes a virtual reality output device 125 (e.g., virtual reality headset), the visual indicator may be displayed proximate to, adjacent to, an avatar representing called entity 160 and/or called party 150. In embodiments where output device 125 includes an audio output device 125, the output may include a sound clip. For example, a sound clip of a siren may be generated on a speaker if the reputation value 420 indicates that called party 150 is likely involved in a scam.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

I claim:

1. A communications device operable by a calling party, the communications device comprising:
   one or more processors configured to:
      receive an identifier associated with a called device from the calling party;
      receive an input command to establish a communications session with the called device from the calling party;
      after the receiving of the input command, attempt to establish the communications session with the called device associated with the called party;
      transmit the identifier to a called-party analyzer, wherein the called-party analyzer, in response to receiving the identifier:
         generates a reputation value based on analysis of data originating from at least one of: (i) a communications service provider, (ii) a caller-name lookup service provider, and (iii) an identity information provider, the reputation value being indicative of a likelihood that at least one of the called device and a called party associated with the called device is involved in attempting to establish unwanted communications sessions, and
         transmits the reputation value destined for the communications device;
      receive the reputation value originating from the called-party analyzer; and
      cause an output generated based on the reputation value on an output device of the communications device.

2. The device of claim 1, wherein the reputation value is generated at least based on analysis of data originating from the communications service provider, and wherein the communications service provider is one of:
   (i) a mobile wireless communications service provider,
   (ii) a landline service provider,
   (iii) a voice over IP (VoIP) service provider, and
   (iv) an instant messaging (IM) service provider.

3. The device of claim 2, wherein the data originating from the communications service provider includes records of past communications sessions involving at least one of the called device and another device associated with the called party.

4. The device of claim 3, wherein the called device is a subscriber of the communications service provider and the data originating from the communications service provider includes subscriber records associated with the called device maintained by the communications service provider.

5. The device of claim 1, wherein the reputation value is generated at least based on analysis of data originating from the caller-name lookup service provider, wherein the caller-name lookup service provider is a Caller ID Name (CNAM) database service provider.

6. The device of claim 5, wherein the data originating from the caller-name lookup service provider includes records of caller-name lookup queries involving at least one of the called device and another device associated with the called party.

7. The device of claim 1, wherein the output is caused to be generated prior to receiving the input command to establish the communications session.

8. The device of claim 1, wherein the identifier includes a phone number and an extension number associated with the called device.

9. The device of claim 1, wherein the output is caused to be generated after receiving the input command to establish the communications session and before attempting to establish the communications session with the called device.

10. The device of claim 1, wherein the output device includes a screen and the output is a visual content generated on the screen of the communications device.

11. A method for a communications device operable by a calling party, comprising:
 receiving an identifier associated with a called device from the calling party;
 receiving an input command to establish a communications session with the called device from the calling party;
 after the receiving of the input command, attempting to establish the communications session with the called device associated with the called party;
 transmitting the identifier to a called-party analyzer, wherein the called-party analyzer, in response to receiving the identifier:
  generates a reputation value based on analysis of data originating from at least one of: (i) a communications service provider, (ii) a caller-name lookup service provider, and (iii) an identity information provider, the reputation value being indicative of a likelihood that at least one of the called device and a called party associated with the called device is involved in attempting to establish unwanted communications sessions, and
  transmits the reputation value destined for the communications device;
 receiving the reputation value originating from the called-party analyzer; and
 causing an output generated based on the reputation value on an output the communications device.

12. The method of claim 11, wherein the reputation value is generated at least based on analysis of data originating from the communications service provider, and wherein the communications service provider is one of:
 (i) a mobile wireless communications service provider,
 (ii) a landline service provider,
 (iii) a voice over IP (VoIP) service provider, and
 (iv) an instant messaging (IM) service provider.

13. The method of claim 12, wherein the data originating from the communications service provider includes records of past communications sessions involving at least one of the called device and another device associated with the called party.

14. The method of claim 13, wherein the called device is a subscriber of the communications service provider and the data originating from the communications service provider includes subscriber records associated with the called device maintained by the communications service provider.

15. The method of claim 11, wherein the reputation value is generated at least based on analysis of data originating from the caller-name lookup service provider, wherein the caller-name lookup service provider is a Caller ID Name (CNAM) database service provider.

16. The method of claim 15, wherein the data originating from the caller-name lookup service provider includes records of caller-name lookup queries involving at least one of the called device and another device associated with the called party.

17. The method of claim 11, wherein the output is caused to be generated prior to receiving the input command to establish the communications session.

18. The method of claim 11, wherein the identifier includes a phone number and an extension number associated with the called device.

19. The method of claim 11, wherein the output is caused to be generated after receiving the input command to establish the communications session and before attempting to establish the communications session with the called device.

20. The method of claim 11, wherein the output device includes a screen and the output is a visual content generated on the screen of the communications device.

21. A non-transitory computer-readable storage medium storing instructions that when executed by a computer cause the computer to perform a method for a communications device operable by a calling party, the method comprising:
 receiving an identifier associated with a called device from the calling party;
 receiving an input command to establish a communications session with the called device from the calling party;
 after the receiving of the input command, attempting to establish the communications session with the device associated with the called party;
 transmitting the identifier to a called-party analyzer, wherein the called-party analyzer, in response to receiving the identifier:
  generates a reputation value based on analysis of data originating from at least one of: (i) a communications service provider, (ii) a caller-name lookup service provider, and (iii) an identity information provider, the reputation value being indicative of a likelihood that at least one of the called device and a called party associated with the called device is involved in attempting to establish unwanted communications sessions, and
  transmits the reputation value destined for the communications device;
 receiving the reputation value originating from the called-party analyzer; and causing an output generated based on the reputation value on an output the communications device.

\* \* \* \* \*